United States Patent
Alkhateeb et al.

(10) Patent No.: US 10,181,880 B1
(45) Date of Patent: Jan. 15, 2019

(54) ZONE PRECODING

(71) Applicant: Facebook, Inc., Menlo Park, CA (US)

(72) Inventors: Ahmed Alkhateeb, Fremont, CA (US); Sam Padinjaremannil Alex, Dublin, CA (US); Ali Yazdan Panah, San Francisco, CA (US); Qi Qu, Irvine, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/784,089

(22) Filed: Oct. 14, 2017

(51) Int. Cl.
*H04B 7/0456* (2017.01)
*H04B 7/0452* (2017.01)
*H04W 52/28* (2009.01)
*H04W 52/34* (2009.01)
*H04W 52/24* (2009.01)
*H04W 52/42* (2009.01)

(52) U.S. Cl.
CPC ......... *H04B 7/0452* (2013.01); *H04B 7/0465* (2013.01); *H04W 52/243* (2013.01); *H04W 52/283* (2013.01); *H04W 52/346* (2013.01); *H04W 52/42* (2013.01)

(58) Field of Classification Search
CPC . H04B 7/0452; H04B 7/0465; H04W 52/243; H04W 52/283; H04W 52/346; H04W 52/42
See application file for complete search history.

(56) References Cited

U.S. PATENT DOCUMENTS

| 8,693,574 | B2 | 4/2014 | Mizuta et al. |
| 9,510,339 | B2 | 11/2016 | Seo |
| 2013/0051302 | A1 | 2/2013 | Kim |
| 2014/0126666 | A1 | 5/2014 | Goldsmith et al. |
| 2016/0226567 | A1 | 8/2016 | Jia et al. |
| 2017/0026218 | A1 | 1/2017 | Shattil |
| 2017/0085358 | A1 | 3/2017 | Huberman et al. |
| 2017/0126458 | A1 | 5/2017 | Shattil |

(Continued)

FOREIGN PATENT DOCUMENTS

KR 20150035705 4/2015

OTHER PUBLICATIONS

PCT/US2017/056751, International Filing Date Oct. 16, 2017, International Search Report, dated Jul. 13, 2018.

(Continued)

*Primary Examiner* — Daniel S Huang
(74) *Attorney, Agent, or Firm* — Brian R. Short

(57) ABSTRACT

Apparatuses, methods, and systems zone precoding are disclosed. One method includes training a transmission channel between a base station and each of a plurality of users and determining a precoding of transmission signals to each of the plurality of users from the base station. The training includes determining a transmission zone for each of the plurality of users, wherein the transmission zone includes an angle of direction of a directional beam to each user, and a deviation of the angle of direction. Determining a precoding of transmission signals to each of the plurality of users from the base station, includes determining an initial precoding for each of the users based on the transmission zone associated with the user, and constructing the precoding for each user by adjusting the initial precoding for each user based on the transmission zone determined for each of the other users.

20 Claims, 7 Drawing Sheets

(56) References Cited

U.S. PATENT DOCUMENTS

2017/0180020 A1    6/2017  Namgoong et al.
2018/0034606 A1*   2/2018  Ahn ..................... H04L 5/0048
2018/0205436 A1*   7/2018  Gil ..................... H04B 7/0617

OTHER PUBLICATIONS

PCT/US2017/056751, International Filing Date Oct. 16, 2017, Written Opinion of the International Searching Authority, dated Jul. 13, 2018.

* cited by examiner

Training a transmission channel between a base station and each of a plurality of users, wherein the base station comprises a plurality of antennas that operate to form directional beams to each of the plurality of users, comprising determining a transmission zone for each of the plurality of users, wherein the transmission zone includes an angle of direction of a directional beam to each user, and a deviation of the angle of direction

410

Determining a precoding of transmission signals to each of the plurality of users from the base station, comprising determining an initial precoding for each of the users based on the transmission zone associated with the user, wherein the initial precoding is selected to provide a received power over the transmission zone of the user that deviates by less than a threshold, and constructing the precoding for each user comprising adjusting the initial precoding for each user based on the transmission zone determined for each of the other users

420

Applying the precoding of each user to wireless communication signals communicated between the base station and the user.

Training a transmission channel between a base station and each of a plurality of users, wherein the base station comprises a plurality of antennas that operate to form directional beams to each of the plurality of users, comprising determining a transmission zone for each of the plurality of users, wherein the transmission zone includes an angle of direction of a directional beam to each user, and a deviation of the angle of direction

510

Selecting a precoding of transmission signals to each of the plurality of users from the base station to provide a received power that deviates by less than a threshold over the transmission zone, and wherein received interference within transmission zones of other users is below a threshold

520

Applying the precoding of each user to wireless communication signals communicated between the base station and the user.

ZONE PRECODING

FIELD OF THE DESCRIBED EMBODIMENTS

The described embodiments relate generally to wireless communications. More particularly, the described embodiments relate to systems, methods and apparatuses for precoding MIMO (multiple-input, multiple-output) communication signals according to identified zones of users.

BACKGROUND

Massive MIMO (multiple-input, multiple output) systems typically include a large number of antennas. Accordingly, the performance of such systems is very sensitive to the accuracy of channel knowledge. Further, some massive MIMO systems, such as implementation using drones or wind sensitive high tower deployments suffer from random movements of either the antennas.

It is desirable to have methods apparatuses, and systems for precoding MIMO (multiple-input, multi-output) signals according to identified zones of users.

SUMMARY

An embodiment includes a method of zone precoding. The method includes training a transmission channel between a base station and each of a plurality of users, wherein the base station includes a plurality of antennas that operate to form directional beams to each of the plurality of users. The method further includes determining a precoding of transmission signals to each of the plurality of users from the base station, and applying the precoding of each user to wireless communication signals communicated between the base station and the user. For an embodiment, the training includes determining a transmission zone for each of the plurality of users, wherein the transmission zone includes an angle of direction of a directional beam to each user, and a deviation of the angle of direction. For at least some embodiments, determining a precoding of transmission signals to each of the plurality of users from the base station, includes determining an initial precoding for each of the users based on the transmission zone associated with the user, wherein the initial precoding is selected to provide a received power at the user that deviates by less than a threshold over the transmission zone, and constructing the precoding for each user comprising adjusting the initial precoding for each user based on the transmission zone determined for each of the other users.

Another embodiment includes a basestation. The basetation includes a plurality of antennas, a plurality of radios connected to the plurality of antennas, and a controller. The controller operates to determine a training of a transmission channel between the plurality of antennas of the base station and each of a plurality of users, wherein the plurality of antennas operate to form directional beams to each of the plurality of users, comprising determining a transmission zone for each of the plurality of users, wherein the transmission zone includes an angle of direction of a directional beam to each user, and a deviation of the angle of direction. The controller further operates to determine a precoding of transmission signals to each of the plurality of users from the base station, including determine an initial precoding for each of the users based on the zone associated with the user, wherein the initial precoding is selected to provide a received power over the transmission zone of the user that deviates by less than a threshold, and construct the precoding for each user comprising adjusting the initial precoding for each user based on the transmission zone determined for each of the other users. The controller further operates to apply the precoding of each user to wireless communication signals communicated between the plurality of antennas of the base station and the user.

An embodiment includes a method of zone precoding. The method includes training a transmission channel between a base station and each of a plurality of users, wherein the base station comprises a plurality of antennas that operate to form directional beams to each of the plurality of users, comprising determining a transmission zone for each of the plurality of users, wherein the transmission zone includes an angle of direction of a directional beam to each user, and a deviation of the angle of direction. The method further includes selecting a precoding of transmission signals to each of the plurality of users from the base station to provide a received power that deviates by less than a threshold over the transmission zone, and wherein received interference within transmission zones of other users is below a threshold, and applying the precoding of each user to wireless communication signals between the base station and the user.

Embodiments according to the invention are in particular disclosed in the attached claims directed to a method and a basestation, wherein any feature mentioned in one claim category, e.g. method, can be claimed in another claim category, e.g. basestation, system, storage medium, and computer program product, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment according to the invention, a method may comprise training a transmission channel between a base station and each of a plurality of users, wherein the base station comprises a plurality of antennas that operate to form directional beams to each of the plurality of users, comprising determining a transmission zone for each of the plurality of users, wherein the transmission zone includes an angle of direction of a directional beam to each user, and a deviation of the angle of direction, determining a precoding of transmission signals to each of the plurality of users from the base station, comprising determining an initial precoding for each of the users based on the transmission zone associated with the user, wherein the initial precoding is selected to provide a received power at the user that deviates by less than a threshold over the transmission zone, constructing the precoding for each user comprising adjusting the initial precoding for each user based on the transmission zone determined for each of the other users, and applying the precoding of each user to wireless communication signals communicated between the base station and the user.

Determining the transmission zone for each of the plurality of users may comprise determining a direction to the user, determining an indicator of a stability of the plurality of antennas of the base station.

Determining the transmission zone for each of the plurality of users may comprises determining a direction to the user, determining a distance between the user and the based station, and determining a level of mobility of the user.

Determining the transmission zone for each of the plurality of users may comprises determining a cone covariance matrix of radius r for each of the users, wherein r is based on the deviation of the angle of direction.

Determining the cone covariance matrix may comprise determining every element of the cone covariance matrix over the transmission zone, wherein the transmission zone is defined by the direction and radius r.

Determining each element of the cone covariance matrix may comprise determining a covariance between pairs of antenna elements n and m over the transmission zone.

Determining the initial precoding of each user for communication between the base station and each of the users may comprise constructing an initial precoding vector for each user.

Determining the initial precoding vector for each user may comprise:

determining a dictionary matrix A that includes a set of vectors, wherein each vector of the set of vectors defines a quantized direction in an angular domain; and constructing initial precoding, using a least square method, for each user to ensure a target received power over a set of vectors of the dictionary matrix A that define the transmission zone of the user.

Adjusting the initial precoding for each user based on the transmission zone determined for each of the other users may comprise determining an interference nulling matrix for the user for the transmission zones of other users.

Determining the interference nulling matrix may include determining subspaces of the interference nulling matrix to ensure that a signal transmitted by the user does not cause interference in transmission zones of the other users.

Determining the precoding may comprise determining a precoding matrix, wherein the precoding matrix may include a precoding vector for each user.

Determining the precoding matrix may comprise constructing the precoding vector for each user by projecting an initial precoding vector of the user on interference nulling matrices of the other users.

In an embodiment according to the invention, a base station may comprise a plurality of antennas, a plurality of radios connected to the plurality of antennas, a controller, wherein the controller operates to determine a training of a transmission channel between the plurality of antennas of the base station and each of a plurality of users, wherein the plurality of antennas operate to form directional beams to each of the plurality of users, comprising determining a transmission zone for each of the plurality of users, wherein the transmission zone includes an angle of direction of a directional beam to each user, and a deviation of the angle of direction, determine a precoding of transmission signals to each of the plurality of users from the base station, comprising determine an initial precoding for each of the users based on the zone associated with the user, wherein the initial precoding is selected to provide a received power over the transmission zone of the user that deviates by less than a threshold, and construct the precoding for each user comprising adjusting the initial precoding for each user based on the transmission zone determined for each of the other users, and apply the precoding of each user to wireless communication signals communicated between the plurality of antennas of the base station and the user.

Determining the transmission zone for each of the plurality of users may comprise determining a cone covariance matrix of radius r for each of the users, wherein r is based on the deviation of the angle of direction, and wherein determining the cone covariance matrix comprises determining each element of the cone covariance matrix over the transmission zone, wherein the transmission zone is defined by the direction and radius r, wherein determining each element of the cone covariance matrix comprises determining a covariance between pairs of antenna elements n and m over the transmission zone.

Determining the initial precoding of each user for communication between the base station and each of the users may comprise constructing an initial precoding vector for each user, which may comprise determining a dictionary matrix A that includes a set of vectors, wherein each vector of the set of vectors defines a quantized direction in an angular domain; and constructing initial precoding, using a least square method, for each user to ensure a target received power over a set of vectors of the dictionary matrix A that define the transmission zone of the user.

Adjusting the initial precoding for each user based on the transmission zone determined for each of the other users may comprise determining an interference nulling matrix for the user for the transmission zones of other users.

Determining the interference nulling matrix may include determining subspaces of the interference nulling matrix to ensure that a signal transmitted by the user does not cause interference in transmission zones of the other users.

Determining the precoding may comprise determining a precoding matrix, wherein the precoding matrix may include a precoding vector for each user.

Determining the precoding matrix may comprise constructing the precoding vector for each user by projecting an initial precoding vector of the user on interference nulling matrices of the other users.

In an embodiment according to the invention, a method may comprise:

training a transmission channel between a base station and each of a plurality of users, wherein the base station comprises a plurality of antennas that operate to form directional beams to each of the plurality of users, comprising determining a transmission zone for each of the plurality of users, wherein the transmission zone includes an angle of direction of a directional beam to each user, and a deviation of the angle of direction, selecting a precoding of transmission signals to each of the plurality of users from the base station to provide a received power that deviates by less than a threshold over the transmission zone, and wherein received interference within transmission zones of other users is below a threshold, and applying the precoding of each user to wireless communication signals between the base station and the user.

In an embodiment according to the invention, one or more computer-readable non-transitory storage media may embody software that is operable when executed to perform a method according to the invention or any of the above mentioned embodiments.

In an embodiment according to the invention, a system may comprise: one or more processors; and at least one memory coupled to the processors and comprising instructions executable by the processors, the processors operable when executing the instructions to perform a method according to the invention or any of the above mentioned embodiments.

In an embodiment according to the invention, a computer program product, preferably comprising a computer-readable non-transitory storage media, may be operable when executed on a data processing system to perform a method according to the invention or any of the above mentioned embodiments.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 4 is a flow chart that includes acts of a method of zone precoding, according to an embodiment.

FIG. 5 is a flow chart that includes acts of a method of zone precoding, according to another embodiment.

DETAILED DESCRIPTION

The embodiments described include methods, apparatuses, and systems for precoding signals communicated between a basestation having multiple antennas and multiple users, wherein the precoding is selected based on zones associated with each of the multiple users.

At least some of the described embodiments provide robustness in achievable rates of data transmission when challenged with user mobility and random angle perturbation (due, for example, to motion of antennas). This is particularly important for massive MIMO and mmWave MIMO systems where large numbers of antennas are deployed and where the performance is very sensitive to accurate channel knowledge. Further, the described embodiments are useful for systems that suffer from random movements such as drones and wind-sensitive high-tower deployments.

Figure 1:
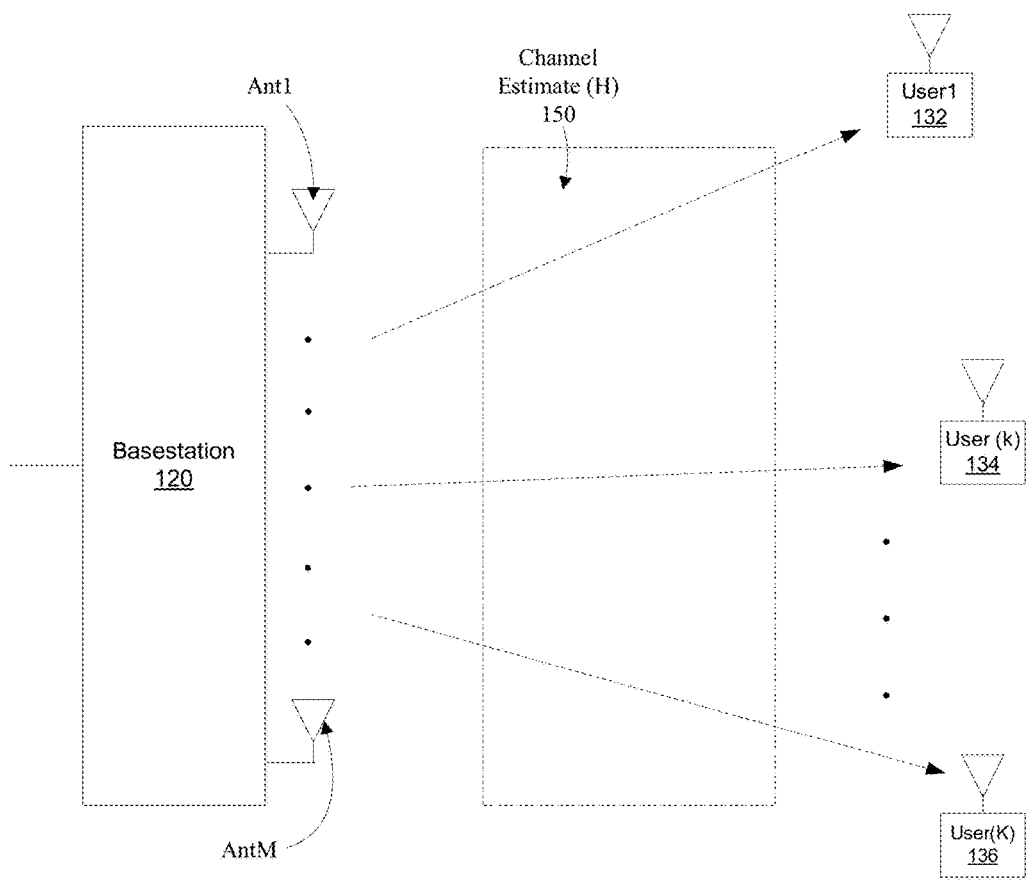
FIG. 1 shows a system that includes a basestation having M antennas that communicates with K single-antenna users, according to an embodiment.

FIG. 1 shows a system that includes a basestation 120 having M antennas that communicates with K single-antenna users 132, 134, 136, according to an embodiment. While shown and described as single-antenna users, it is to be understood that the described embodiments are applicable to multiple antenna users as well. For at least some embodiments, in the downlink transmission, the basestation 120 employs a precoding matrix F to transmit symbols s to the K users 132, 134, 136. The received signal at every user k, k=1, . . . , K can be written as:

$$r^k = h_k^* Fs + n_k$$

where $h_k$ is an M×1 channel vector of the k-th user and the transmit signal is normalized so that $$E[s \ s^*] = \frac{P}{K}I,$$

with a total transmit power of P.

The transmission channel between the basestation 120 and the K users 132, 134, 136 can be modeled by a channel estimate (H=[$h_1$, . . . , $h_K$]) 150. For at least some embodiments, the channel estimate H is determined by training of the transmission channel between the based station 120 and the users. For an embodiment, the training includes transmitting known signals (symbols) between the basestation and the users, and observing the received signals.

As will be described, for at least some embodiments, the transmission channel H between the basestation 120 and the users 132, 134, 136 is retrained. For an embodiment, the training is performed periodically. For an embodiment, the period is selected based on a mobility of the user, sensed location changes of the user, or a stability of antennas of the basestation. For at embodiment, the training is performed not periodically, but based on sensing a condition. For an embodiment, the condition for performing the training is based on a mobility of the user, sensed location changes of the user, or a stability of antennas of the basestation.

For a line-of-sight (LOS) channel model, a channel for every user can be constructed as an array response vector that corresponds with an angle of departure (AoD) associated with the location of the user. According to this channel model, the channel of user k=1, . . . , K can be expressed as:

$$h_k = \left[1, \exp\left(j\frac{2\pi d}{\lambda}\cos(\theta_k)\right), \exp j 2\frac{2\pi d}{\lambda}d\cos(\theta_k), \ldots, \exp\left(j(M-1)\frac{2\pi d}{\lambda}d\cos(\theta_k)\right)\right], \text{where}(\theta_k)$$

is the angle of direction (AoD) of user k, d is the spacing between the antenna elements, and λ is the wavelength.

Figure 2:
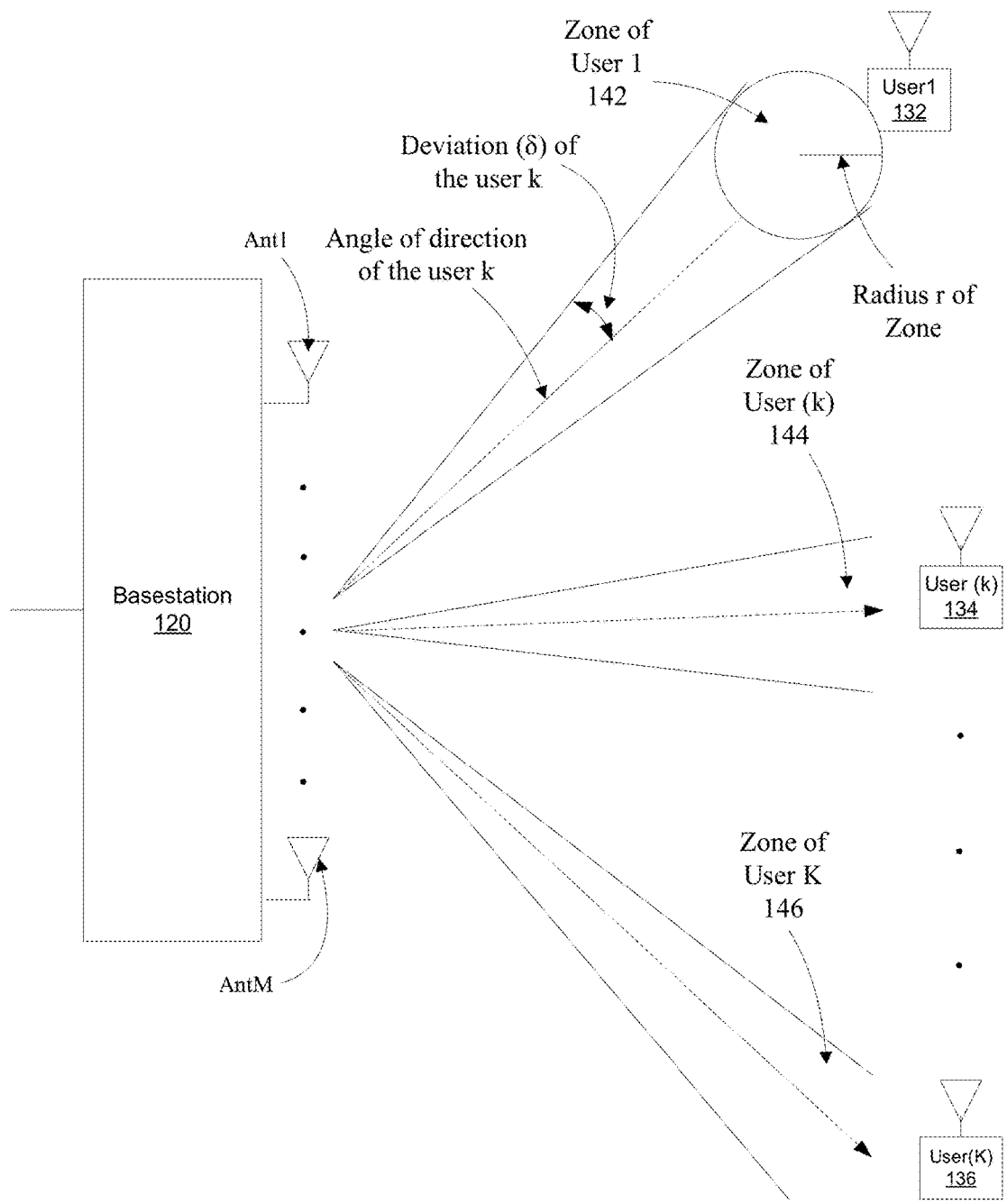
FIG. 2 shows a system that includes a basestation having M antennas that communicates with K single-antenna users, wherein precoding of communication with K users is based on identified zones of the K users, according to an embodiment.

FIG. 2 shows a system that includes a basestation 120 having M antennas that communicates with K single-antenna users 132, 134, 136, wherein precoding of communication with K users is based on identified zones 142, 144, 146 of the K users, according to an embodiment. The plurality of M antennas of the basestation operates to form directional beams to each of the plurality of users.

At least some embodiments include identifying transmission zones for each of the K users by training the transmission channel between the base station and each of a plurality of K users. For at least some embodiments, the training includes determining a transmission zone for each of the plurality of users, wherein the transmission zone includes determining an angle of direction of a directional beam to each user, and a deviation of the angle of direction.

After the transmission zone for each of the plurality of users has been determined, an embodiment includes determining a precoding of transmission signals to each of the plurality of users from the base station. For at least some embodiments, determining the precoding includes determining an initial precoding for each of the users based on the transmission zone associated with the user, wherein the initial precoding is selected to provide a received power at the user that deviates by less than a threshold over the transmission zone. That is, the initial precoding is selected to maintain a near-constant level of received power across the transmission zone of the user.

Once the initial precoding for each of the users has been determined, the effect of each of the users on each of the other users is determined. That is, the initial precoding for each user forms a directional beam directed to each of the transmission zones of each of the users. However, directionally formed beams naturally include side lobes. The side lobes of each of the directional beams of each user may cause interference with other of the users. For an embodiment, the initial precoding for each user is adjusted or modified to reduce the effects of side lobe energy of the directional beam of the user on other of the users. That is, for an embodiment, constructing the precoding for each user includes adjusting the initial precoding for each user based on the transmission zone determined for each of the other users. Further, the initial precoding for each of the users is adjusted to reduce the impact of the transmission between the basestation and each user on the other users. That is, the initial precoding for a user is selected to ensure a near-constant level of received power over the transmission zone of the user, and the precoding is selected by updating or adjusting the initial precoding to reduce (or eliminate) the impact the precoding of each user has on the transmission zones of the other users.

Once the precoding has been determined, the precoding is applied of each user to wireless communication signals communicated between the base station and the user.

Transmission Zones

As described, for an embodiment, the transmission zone of each of the users is determined or defined by the angle of direction of a directional beam to each user, and a deviation of the angle of direction. Factors that can influence the transmission zone selection or determination include a stability of one or more of the plurality of antennas of the base station, or a mobility of the user. That is, if either the one or more of the plurality of antennas of the base station, or the antenna of the user are prone to movement, then the transmission zone may be accordingly increased in size depending upon the level or degree of movement. The transmission zones for the different users can be of varying sizes.

As previously described, for an embodiment, the transmission zone of each of the users is determined during the channel training. Also, as previously described, for an embodiment, the transmission channel between the basestation 120 and the users 132, 134, 136 is retrained, which can yield a revised or new angle of direction of the directional beam to one or more of the users, and a new or revised deviation of the angle of direction to the one or more of the users. For an embodiment, the training is performed periodically. For an embodiment, the period is selected based on a mobility of the user, sensed location changes of the user, or a stability of antennas of the basestation. For at embodiment, the training is performed based on sensing a condition. For an embodiment, the condition sensed for performing the training is based on a mobility of the user, sensed location changes of the user, or a stability of antennas of the basestation.

Alternatively or additionally, the transmission zone for each of the plurality of users can be influenced by the distance between the user and the base station, and/or a level of mobility of the user. That is, the farther the user is away from the base station, the more sensitive the system is to motion of either the basestation or the user(s). Therefore, for user mobility, the size of the transmission zone can be decreased as the distance between the basestation and the user is increased. However, for pertubations or vibrations in the antenna elements, the size of the transmission zone can be increased as the distance between the basestation and the user is increased.

Further, size of the transmission zone can be increased as the mobility of the user increases. That is, a mobile user changes location. The more mobile the user is, the more rapidly the location changes. For at least some embodiments, the size of the transmission zone is selected based at least in part on a level of mobility of the user.

For at least some embodiments determining the transmission zone for each of the plurality of users includes determining a cone covariance matrix of radius r for each of the users, wherein r is based on the deviation of the angle of direction (the radius r for the transmission zone of User 1 is shown in FIG. 2). The greater the deviation in the angle of direction, the greater the size of the transmission zone, and the radius r of the transmission zone.

For at least some embodiments, determining the cone covariance matrix includes determining each element of the cone covariance matrix over the transmission zone, wherein the transmission zone is defined by the direction and radius r. For at least some embodiments, determining each element of the cone covariance matrix includes determining a covariance between pairs of antenna elements n and m over the transmission zone. That is each element of the channel covariance matrix is given by the covariance computed over the transmission zone defined by direction and radius between any pair of antennas at the base station for each antenna pair of the plurality of antennas of the basestation.

For at least some embodiments, determining the cone covariance matrix includes calculating the cone covariance matrix $[R_k]_{m,n}$ as follows:

$$[R_k]_{m,n} = \int_{-r}^{r} \exp\left(j\left(\frac{2\pi}{\lambda}\right)(m-n)\cos((\theta_k)+\delta)\right)d\delta,$$

where $[R_k]_{m,n}$ is the element of the cone covariance matrix $R_k$ at the m-th row and the n-th column. Further, for a user k, $(\theta_k)$ is the angle of direction of the user, $\delta$ is the deviation angular direction of the user, and $\lambda$ is the wavelength of the electromagnetic signal communicated between the basestation and the user, and r is the radius of the transmission zone at the user k.

For at least some embodiments, the cone covariance matrices of the K users define sub-spaces of the zones/regions around each of the K users.

Initial Precoding

As previously described, for at least some embodiments, the initial precoding is selected to provide a received power at the user that deviates by less than a threshold over the transmission zone. That is, the initial precoding is selected to maintain a near-constant level of received power across the transmission zone.

For at least some embodiments, determining the initial precoding of each user for communication between the base station and each of the users includes constructing an initial precoding vector for each user. For an embodiment, determining the initial precoding vector for each user includes determining a dictionary matrix A that includes a set of vectors, wherein each vector of the set of vectors defines a quantized direction in an angular domain, and constructing initial precoding, using a least square method, for each user to ensure a target received power over a set of vectors of the dictionary matrix A that define the transmission zone of the user. The method of least squares is a standard approach in regression analysis to an approximate solution of overdetermined systems. That is, sets of equations in which there are more equations than unknowns. For a given A, initial precoding is constructed for each user k to ensure a target received power over set of vectors of A that define the transmission zone of the user using the least squared method.

For at least some embodiment, determining the initial precoding vector for each user include computing the initial precoding vector (also referred to as an equivalent channel vector) $[|\$]\$~\$\$[|\$]\$~A\check{P}\tilde{h}_k$ includes:

$$[|\$]\$~\$\$[|\$]\$~A\check{P}\tilde{h}_k = A^\dagger p_k$$

Where $A^\dagger$ is the pseudo-inverse of the matrix A, and A is the previously described dictionary matrix, wherein columns of the dictionary matrix are an array response of vectors of uniformly quantized angles in a range [0, 180], and $$p_k = \text{diag}(A^*[U_k]_{:,1:rank(Rk)}[U_k]_{:,1:rank(Rk)}A)$$

where $U_k$ is a matrix that gathers (includes) the left singular vectors of $R_k$, and results from a singular value decomposition (SVD) of $R_k = U_k S_k V_k$ For at least some embodiments, the initial precoding vector $[|\$]\$~\$\$[|\$]\$~A\check{P}\tilde{h}_k$ is constructed so that projections of the initial precoding vector $[|\$]\$~\$\$[|\$]\$~A\check{P}\tilde{h}_k$ on the columns of the dictionary matrix A is approximately equal to the sum of the power of the projections of $[U_k]_{:,1:rank(Rk)}$ on the columns of the dictionary matrix A.

Precoding

As previously described, for at least some embodiment, the precoding is determined or constructed by adjusting or updating the initial precoding. That is, the effects of the initial precoding of each user on the transmission zones other users, is used to adjust the initial precoding. That is, interference (due, for example, to side lobes) caused the initial precoding of a user within the transmission zones of the other users is used adjust the precoding of the user.

For at least some embodiments, adjusting the initial precoding for each user based on the transmission zone determined for each of the other users comprises determining an interference nulling matrix. For at least some embodiments, determining the interference nulling matrix includes determining subspaces of the interference nulling matrix to ensure that a signal transmitted by the user does not cause interference in transmission zones of the other users.

For at least some embodiments, determining the precoding comprises determining a precoding matrix, wherein the precoding matrix includes a precoding vector for each user. For at least some embodiments, determining the precoding matrix comprises constructing the precoding vector for each user by projecting an initial precoding vector of the user on interference nulling matrices of the other users.

For an embodiment, the precoding of the basestation includes determining a precoding matrix F as:

$$F = PP^*[|\$]\$~\$\$[|\$]\$~A\check{P}\tilde{H},$$

where $[|\$]\$~\$\$[|\$]\$~A\check{P}\tilde{H}$ is an M×K equivalent channel matrix that includes the equivalent channel vectors (columns) of the K users, and where P is an interference projection matrix.

For at least some embodiments, the interference matrix P is determined as follows:

$$P = [U_1^{null}, U_2^{null}, \ldots, U_K^{null}],$$

wherein for an embodiment, $U_k^{Null}$ is a matrix that represents left singular vectors of the null-space of a matrix that results from summing the cone covariance matrices of all the users except user k.

Figure 3:
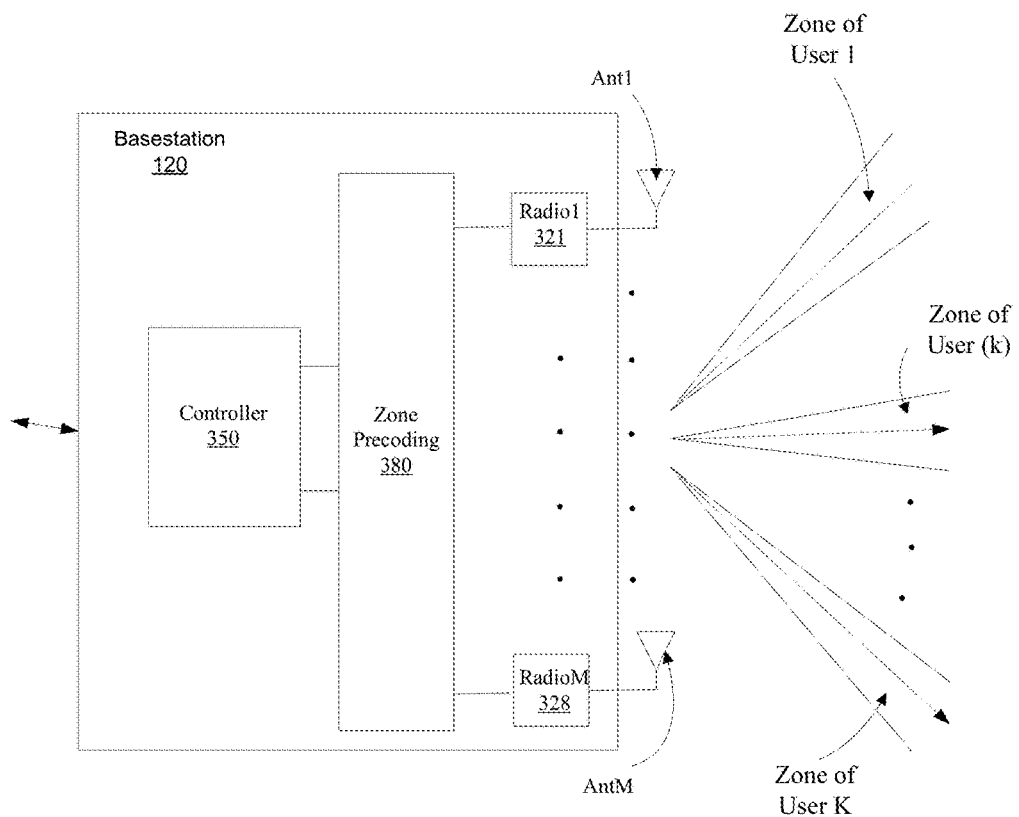
FIG. 3 shows a basestation having M antennas, wherein precoding of communication with users is based on identified zones of the users, according to an embodiment.

FIG. 3 shows a basestation 120 having M antennas, wherein precoding of communication with users is based on identified zones of the users, according to an embodiment. As shown, the basestation 120 includes a controller 350, zone precoding 380, M radios 321, 328, and M antennas (Ant1, AntM). The M antennas operate to form directional beams to K users. The precoding of the zone precoder 380 is selected to form a transmission zone for each of the K users.

For at least some embodiments, the controller 350 operates to determine a training of a transmission channel between the plurality of antennas of the base station and each of a plurality of users, wherein the plurality of antennas operate to form directional beams to each of the plurality of users, comprising determining a transmission zone for each of the plurality of users, wherein the transmission zone includes an angle of direction of a directional beam to each user, and a deviation of the angle of direction. Further, the controller 350 is operative to determine a precoding of transmission signals to each of the plurality of users from the base station, including determine an initial precoding for each of the users based on the zone associated with the user, wherein the initial precoding is selected to provide a received power over the transmission zone of the user that deviates by less than a threshold, and construct the precoding for each user comprising adjusting the initial precoding for each user based on the transmission zone determined for each of the other users. Further, the controller 350 is operative to apply the precoding of each user to wireless communication signals communicated between the plurality of antennas of the base station and the user.

FIG. 4 is a flow chart that includes acts of a method of zone precoding, according to an embodiment. A first step 410 includes training a transmission channel between a base station and each of a plurality of users, wherein the base station comprises a plurality of antennas that operate to form directional beams to each of the plurality of users. For at least some embodiments, training a transmission channel between a base station and each of a plurality of users comprises determining a transmission zone for each of the plurality of users, wherein the transmission zone includes an angle of direction of a directional beam to each user, and a deviation of the angle of direction. A second step 420 includes determining a precoding of transmission signals to each of the plurality of users from the base station. For at least some embodiments, determining the precoding of transmission signals to each of the plurality of users from the base station comprises determining an initial precoding for each of the users based on the transmission zone associated with the user, wherein the initial precoding is selected to provide a received power at the user that deviates by less than a threshold over the transmission zone, and constructing the precoding for each user comprising adjusting the initial precoding for each user based on the transmission zone determined for each of the other users. A third step 430 includes applying the precoding of each user to wireless communication signals between the base station and the user.

As previously described, for an embodiment, determining the transmission zone for each of the plurality of users includes determining a direction to the user, determining an indicator of \a stability of the plurality of antennas of the base station. As previously described, for an embodiment, determining the transmission zone for each of the plurality of users comprises determining a direction to the user, determining a distance between the user and the based station, and determining a level of mobility of the user.

As previously described, for an embodiment, determining the transmission zone for each of the plurality of users comprises determining a cone covariance matrix of radius r for each of the users, wherein r is based on the deviation of the angle of direction. As previously described, for an embodiment, determining the cone covariance matrix comprises determining every element of the cone covariance matrix over the transmission zone, wherein the transmission zone is defined by the direction and radius r. As previously described, for an embodiment, determining each element of the cone covariance matrix comprises determining a covariance between pairs of antenna elements n and m over the transmission zone.

As previously described, for an embodiment, determining the initial precoding of each user for communication between the base station and each of the users comprises constructing an initial precoding vector for each user. For an embodiment, determining the initial precoding vector for each user includes determining a dictionary matrix A that includes a set of vectors, wherein each vector of the set of vectors defines a quantized direction in an angular domain, and constructing initial precoding, using a least square method, for each user to ensure a target received power over a set of vectors of the dictionary matrix A that define the transmission zone of the user.

As previously described, for an embodiment, adjusting the initial precoding for each user based on the transmission zone determined for each of the other users comprises determining an interference nulling matrix for the user for the transmission zones of other users. For an embodiment, determining the interference nulling matrix includes determining subspaces of the interference nulling matrix to ensure that a signal transmitted by the user does not cause interference in transmission zones of the other users.

As previously described, for an embodiment, determining the precoding comprises determining a precoding matrix, wherein the precoding matrix includes a precoding vector for each user. For an embodiment, determining the precoding matrix comprises constructing the precoding vector for each user by projecting an initial precoding vector of the user on interference nulling matrices of the other users.

FIG. 5 is a flow chart that includes acts of a method of zone precoding, according to another embodiment. A first step 510 includes training a transmission channel between a base station and each of a plurality of users, wherein the base station comprises a plurality of antennas that operate to form directional beams to each of the plurality of users, include determining a transmission zone for each of the plurality of users, wherein the transmission zone includes an angle of direction of a directional beam to each user, and a deviation of the angle of direction. A second step 520 includes selecting a precoding of transmission signals to each of the plurality of users from the base station to provide a received power that deviates by less than a threshold over the transmission zone, and wherein received interference within transmission zones of other users is below a threshold. A third step 530 includes applying the precoding of each user to wireless communication signals between the base station and the user.

For this embodiment, the precoding is selected to ensure that transmission signals to each of the plurality of users from the base station to provide a received power that deviates by less than a threshold over the transmission zone, and received interference within transmission zones of other users is below a threshold. For an alternate embodiment, the precoding is selected to ensure that received interference within transmission zones of other users is below a threshold. The precoding is then adjusted or selected to ensure that transmission signals to each of the plurality of users from the base station to provide a received power that deviates by less than a threshold over the transmission zone.

Figure 6:
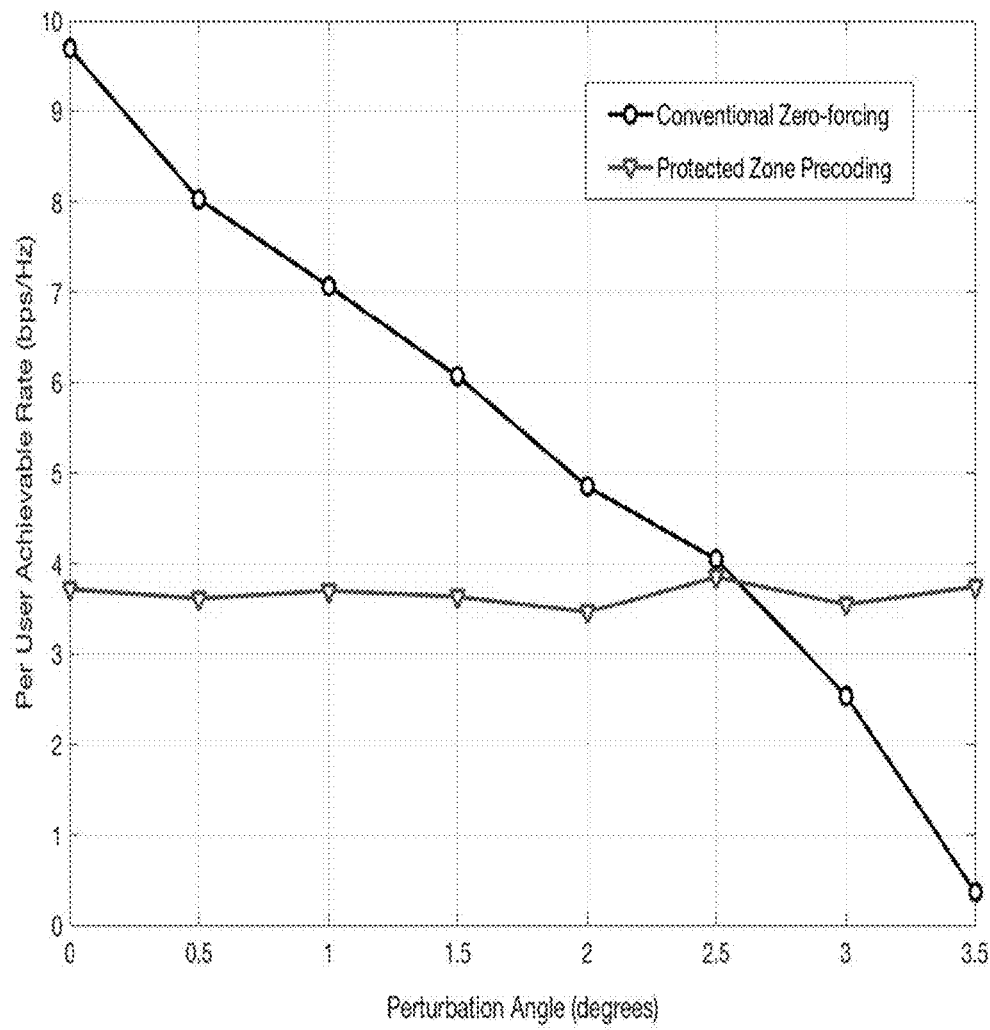
FIG. 6 shows simulated results of a MIMO transmitter, according to an embodiment.

FIG. 6 shows simulated results of a MIMO transmitter, according to an embodiment. This simulated MIMO includes 100 antennas communicating with 5 users. For the simulation, the users are randomly located on a half-circle. That is, the angle of directions (AoD)s of each user is randomly selected from [0, 180] degrees. The achievable rate per-user of conventional zero-forcing [where the precoder is constructed as $F=H^\dagger$] versus the protected-zone precoding of the described embodiments (both of them are normalized such that the columns have unit norm) is illustrated in FIG. 6.

From FIG. 6, is can be observed that when the perturbation angle is large, the described embodiments for zone precoding provide improved gain as compared to conventional zero-forcing precoding. Further, the simulation shows that the described embodiments for zone precoding provide almost constant performance (within a threshold) regardless of the perturbation angle.

Figure 7:
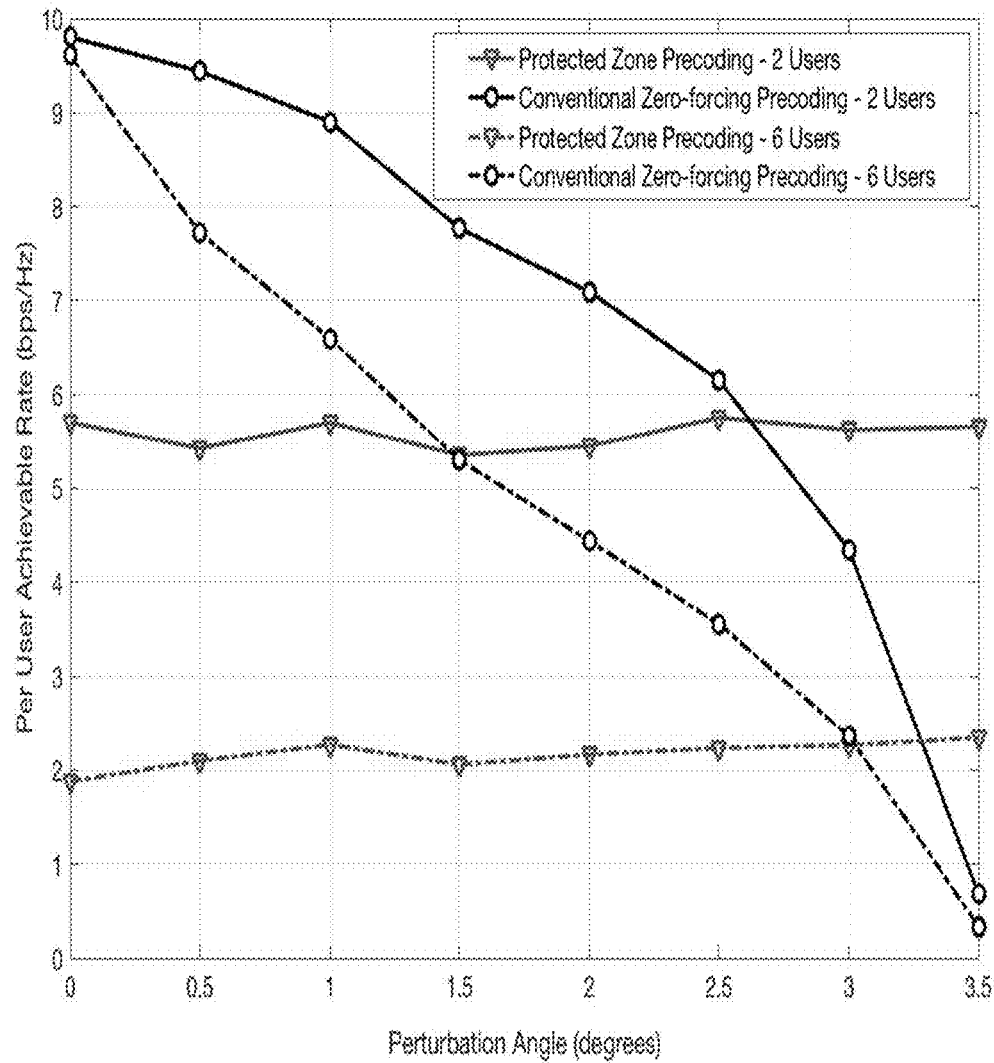
FIG. 7 shows simulated results of a MIMO transmitter, according to an embodiment.

FIG. 7 shows simulated results of a MIMO transmitter, according to an embodiment. This embodiment shows the achievable rate of the described embodiments for zone precoding compared to zero-forcing for different number of users (2 users or 6 users), wherein the number of basestation antennas is fixed at 100, the cone zone is 2 degrees, and the perturbation angle is 2 degrees. FIG. 7 shows that the described embodiments that include protected-zone precoding provide a good gain (within a threshold) over conventional zero-forcing when the number of users is low compared to the number of antennas (this setup has 100 antennas). Note that the gain increases as the number of antennas increases.

Although specific embodiments have been described and illustrated, the embodiments are not to be limited to the specific forms or arrangements of parts so described and illustrated. The described embodiments are to only be limited by the claims.

What is claimed:

1. A method, comprising:
  training a transmission channel between a base station and each of a plurality of users, wherein the base station comprises a plurality of antennas that operate to form directional beams to each of the plurality of users, comprising:
    determining a transmission zone for each of the plurality of users, wherein the transmission zone includes an angle of direction of a directional beam to each user, and a deviation of the angle of direction;
    determining a precoding of transmission signals to each of the plurality of users from the base station, comprising:
      determining an initial precoding for each of the users based on the transmission zone associated with the user, wherein the initial precoding is selected to provide a received power at the user that deviates by less than a threshold over the transmission zone;
      constructing the precoding for each user comprising adjusting the initial precoding for each user based on the transmission zone determined for each of the other users; and
  applying the precoding of each user to wireless communication signals communicated between the base station and the user.

2. The method of claim 1, wherein determining the transmission zone for each of the plurality of users comprises determining a direction to the user, determining an indicator of a stability of the plurality of antennas of the base station.

3. The method of claim 1, wherein determining the transmission zone for each of the plurality of users comprises determining a direction to the user, determining a distance between the user and the based station, and determining a level of mobility of the user.

4. The method of claim 1, wherein determining the transmission zone for each of the plurality of users comprises determining a cone covariance matrix of radius r for each of the users, wherein r is based on the deviation of the angle of direction.

5. The method of claim 4, wherein determining the cone covariance matrix comprises determining every element of the cone covariance matrix over the transmission zone, wherein the transmission zone is defined by the direction and radius r.

6. The method of claim 5, wherein determining each element of the cone covariance matrix comprises determining a covariance between pairs of antenna elements n and m over the transmission zone.

7. The method of claim 1, wherein determining the initial precoding of each user for communication between the base station and each of the users comprises constructing an initial precoding vector for each user.

8. The method of claim 7, wherein determining the initial precoding vector for each user comprises:
    determining a dictionary matrix A that includes a set of vectors, wherein each vector of the set of vectors defines a quantized direction in an angular domain; and
    constructing initial precoding, using a least square method, for each user to ensure a target received power over a set of vectors of the dictionary matrix A that define the transmission zone of the user.

9. The method of claim 1, wherein adjusting the initial precoding for each user based on the transmission zone determined for each of the other users comprises determining an interference nulling matrix for the user for the transmission zones of other users.

10. The method of claim 9, wherein determining the interference nulling matrix includes determining subspaces of the interference nulling matrix to ensure that a signal transmitted by the user does not cause interference in transmission zones of the other users.

11. The method of claim 10, wherein determining the precoding comprises determining a precoding matrix, wherein the precoding matrix includes a precoding vector for each user.

12. The method of claim 10, wherein determining the precoding matrix comprises constructing the precoding vector for each user by projecting an initial precoding vector of the user on interference nulling matrices of the other users.

13. A base station, comprising:
    a plurality of antennas;
    a plurality of radios connected to the plurality of antennas;
    a controller, wherein the controller operates to:
        determine a training of a transmission channel between the plurality of antennas of the base station and each of a plurality of users, wherein the plurality of antennas operate to form directional beams to each of the plurality of users, comprising determining a transmission zone for each of the plurality of users, wherein the transmission zone includes an angle of direction of a directional beam to each user, and a deviation of the angle of direction;
        determine a precoding of transmission signals to each of the plurality of users from the base station, comprising:
            determine an initial precoding for each of the users based on the zone associated with the user, wherein the initial precoding is selected to provide a received power over the transmission zone of the user that deviates by less than a threshold; and
            construct the precoding for each user comprising adjusting the initial precoding for each user based on the transmission zone determined for each of the other users; and
        apply the precoding of each user to wireless communication signals communicated between the plurality of antennas of the base station and the user.

14. The basestation of claim 13, wherein determining the transmission zone for each of the plurality of users comprises determining a cone covariance matrix of radius r for each of the users, wherein r is based on the deviation of the angle of direction, and wherein determining the cone covariance matrix comprises determining each element of the cone covariance matrix over the transmission zone, wherein the transmission zone is defined by the direction and radius r, wherein determining each element of the cone covariance matrix comprises determining a covariance between pairs of antenna elements n and m over the transmission zone.

15. The basestation of claim 13, wherein determining the initial precoding of each user for communication between the base station and each of the users comprises constructing an initial precoding vector for each user, comprising:
    determining a dictionary matrix A that includes a set of vectors, wherein each vector of the set of vectors defines a quantized direction in an angular domain; and
    constructing initial precoding, using a least square method, for each user to ensure a target received power over a set of vectors of the dictionary matrix A that define the transmission zone of the user.

16. The basestation of claim 13, wherein adjusting the initial precoding for each user based on the transmission zone determined for each of the other users comprises determining an interference nulling matrix for the user for the transmission zones of other users.

17. The basestation of claim 16, wherein determining the interference nulling matrix includes determining subspaces of the interference nulling matrix to ensure that a signal transmitted by the user does not cause interference in transmission zones of the other users.

18. The basestation of claim 17, wherein determining the precoding comprises determining a precoding matrix, wherein the precoding matrix includes a precoding vector for each user.

19. The basestation of claim 17, wherein determining the precoding matrix comprises constructing the precoding vector for each user by projecting an initial precoding vector of the user on interference nulling matrices of the other users.

20. A method, comprising:
    training a transmission channel between a base station and each of a plurality of users, wherein the base station comprises a plurality of antennas that operate to form directional beams to each of the plurality of users, comprising:
        determining a transmission zone for each of the plurality of users, wherein the transmission zone includes an angle of direction of a directional beam to each user, and a deviation of the angle of direction;
    selecting a precoding of transmission signals to each of the plurality of users from the base station to provide a received power that deviates by less than a threshold over the transmission zone, and wherein received interference within transmission zones of other users is below a threshold; and applying the precoding of each user to wireless communication signals between the base station and the user.

* * * * *